United States Patent
Oltmanns et al.

(10) Patent No.: US 7,145,995 B2
(45) Date of Patent: Dec. 5, 2006

(54) METHOD FOR SERVER-ASSISTED DATA PROCESSING FOR A PLURALITY OF CLIENTS

(75) Inventors: Claudia Oltmanns, Schönwalde (DE); Gerald Oltmanns, Schönwalde (DE)

(73) Assignee: Siemens Aktiengesellschaft, Munich (DE)

( * ) Notice: Subject to any disclaimer, the term of this patent is extended or adjusted under 35 U.S.C. 154(b) by 825 days.

(21) Appl. No.: 10/370,112

(22) Filed: Feb. 21, 2003

(65) Prior Publication Data
US 2003/0233406 A1    Dec. 18, 2003

(30) Foreign Application Priority Data
Feb. 22, 2002  (DE)  ................... 102 08 432

(51) Int. Cl.
 *H04M 15/00*   (2006.01)
(52) U.S. Cl. .................... 379/114.01; 379/114.03; 379/114.17; 379/114.2
(58) Field of Classification Search .......... 379/114.01, 379/114.03, 114.05, 114.09, 114.17, 114.2, 379/114.22, 121.03, 122, 124, 128–131
See application file for complete search history.

(56) References Cited

U.S. PATENT DOCUMENTS

2004/0141601 A1*  7/2004  Cai et al. .................. 379/114.2

FOREIGN PATENT DOCUMENTS

| WO | WO 01/60045 A2 | 8/2001 |
|----|----|----|
| WO | WO 01/89192 A1 | 11/2001 |

* cited by examiner

*Primary Examiner*—Binh K. Tieu
(74) *Attorney, Agent, or Firm*—Morrison & Foerster LLP

(57) ABSTRACT

A method for server-assisted data processing on a plurality of clients connected at least temporarily to a server. The server manages a defined quantity of processing resource, the clients reserve a respective subset of the processing resource for a reservation period, and the server manages the clients reservations and provides the clients with the reserved subsets of the processing resource for the reservation period, where a confirmation period is defined in which the server is ready to receive a reservation confirmation.

13 Claims, 4 Drawing Sheets

METHOD FOR SERVER-ASSISTED DATA PROCESSING FOR A PLURALITY OF CLIENTS

CLAIM FOR PRIORITY

This application claims priority to Application No. 10208432.7 which was filed in the German language on Feb. 22, 2002.

TECHNICAL FIELD OF THE INVENTION

The invention relates to a method for server-assisted data processing for a plurality of clients which are connected at least temporarily to a server.

BACKGROUND OF THE INVENTION

Conventionally, methods of this type are applied both in computer systems having distributed resources for solving complex processing tasks and, by way of example, in communication networks having a large number of subscribers and also a central electronic billing system. Put in perspective, they have great economic significance in the development and operation of IN services with charge debiting from a prepaid credit.

In the evolution of an IN service (prepaid service), it is possible to reserve partial sums or portions of a service user's and account holder's (subscriber's) credit. The money used up for a telephone call is normally deducted at the end of the call. Only then are the reservations for the call reclaimed.

When calls have been terminated, it is necessary to ensure that the reservations made for them are released again even without this final action. If not, it would no longer be possible to use up the entire credit for telephoning.

This is currently achieved by checking, when any call accesses the account, how long it has been since this account was last accessed. If a prescribable (recovery) time has been exceeded, all reservations are deleted. Upon resetting, it is necessary to ensure that no "live" call is holding a reservation.

With mobile radio links based on the GPRS standard, the account is accessed for always-on scenarios continuously, however, i.e. at least the (charge) portion of the GPRS call is reserved up to the next ACR at all times. It is therefore never possible to reset the reservations on the basis of the current method. The reservations for parallel calls terminated under some circumstances are no longer available to the subscriber.

The main problem is concealed in the recovery mechanism: the recovery time transferred for the RESERVE does not relate to the individual reservation, but rather all reservations are reset to zero if the transferred time since the last reserving access has expired. This results in "hanging" reservations being cancelled only when there is at least one break of the length of the recovery time between two calls. In the case of "normal" calls, this behavior is not so critical, since the recovery time can generally be kept relatively short in this case (billing on the basis of time), and the calls do not last forever, which means that there is a very high chance of a break coming soon.

With GPRS, there is the problem that the calls can last for any length of time (volume-based billing). "Hanging" reservations hardly have any chance, or sometimes have no chance, of being cancelled.

In the case of lengthy calls (GPRS calls or else other calls) or calls in brief succession, reservations for parallel or previous calls which have been terminated may, for the same reason, be released again too late from the subscriber's point of view.

SUMMARY OF THE INVENTION

The invention discloses an improved method of the generic type which allows, in particular, correct handling of resource or credit reservation in modern communication systems, specifically for mobile radio traffic based on the GPRS standard.

In one embodiment of the invention, there is a solution which uses a second reservation sum in which the currently "live" calls continually confirm their overall reservations. At the recovery times, the sum of the reservations is then no longer set to zero, as previously, but rather is replaced by the value of the second reservation sum. Every call entity needs to report back to the account at least once within a certain time (recovery time) and hence to confirm its reservation. Calls which are no longer active will no longer be able to report in order to confirm their reservation. The reservations for these calls are then released again when the account is first accessed after expiry of the recovery time.

In one aspect of the invention, the account manager manages, for each account, not only the normal reservation counter (which, as before, is used for the RESERVE/ CHARGE functionality) but also a further one, in which the reservations confirmed within the currently running recovery interval are summed again. If, after expiry of the recovery time, this sum does not match that on the actual reservation counter, then there is/are call entities which have obviously not reported back again and whose reservations have been invalidated. It is therefore possible to deduct the difference between the counter readings on the two reservation counters from that on the actual reservation counter.

In one preferred embodiment, a maximum reservation period is determined and it is stipulated that the length of a reservation period which the clients can obtain is at most equal to the maximum reservation period.

In addition, preferably prior to the start of the method, a general request for reservation confirmations is transmitted to the clients which applies to reservation periods while the method is being carried out.

For stipulating the length of the maximum reservation period and of the confirmation period on the basis thereof, there are a number of alternative options: in a first variation, prior to the start of the method, the maximum reservation period and on the basis thereof the confirmation period are firmly defined. In a second variation, while the method is being carried out, the reservation periods are detected and are taken as a basis for determining the maximum reservation period, with the confirmation period being defined as a fixed value, based on the maximum reservation period. Finally, in a third variation, the confirmation period is defined dynamically as a ratio value, based on the maximum reservation period, depending on the method being carried out.

At the end of the confirmation period, the quantity of available reservations is compared with the quantity of confirmed reservations, and unconfirmed subsets of the processing resource are released by equating the sum of the reservations to the sum of the confirmed reservations.

The aforementioned application of providing network resources in a mobile radio network for GPRS calls on the basis of a prepaid credit involves not only reserving processing resources in the form of computer and transmission capacities, but in particular also handling virtual sums of money, specifically debiting from virtual credits.

BRIEF DESCRIPTION OF THE DRAWINGS

The description below gives a detailed explanation of advantageous aspects of the invention with reference to the figures. These figures use illustrations to show examples of various call scenarios, in which.

DETAILED DESCRIPTION OF THE INVENTION

Figure 1:
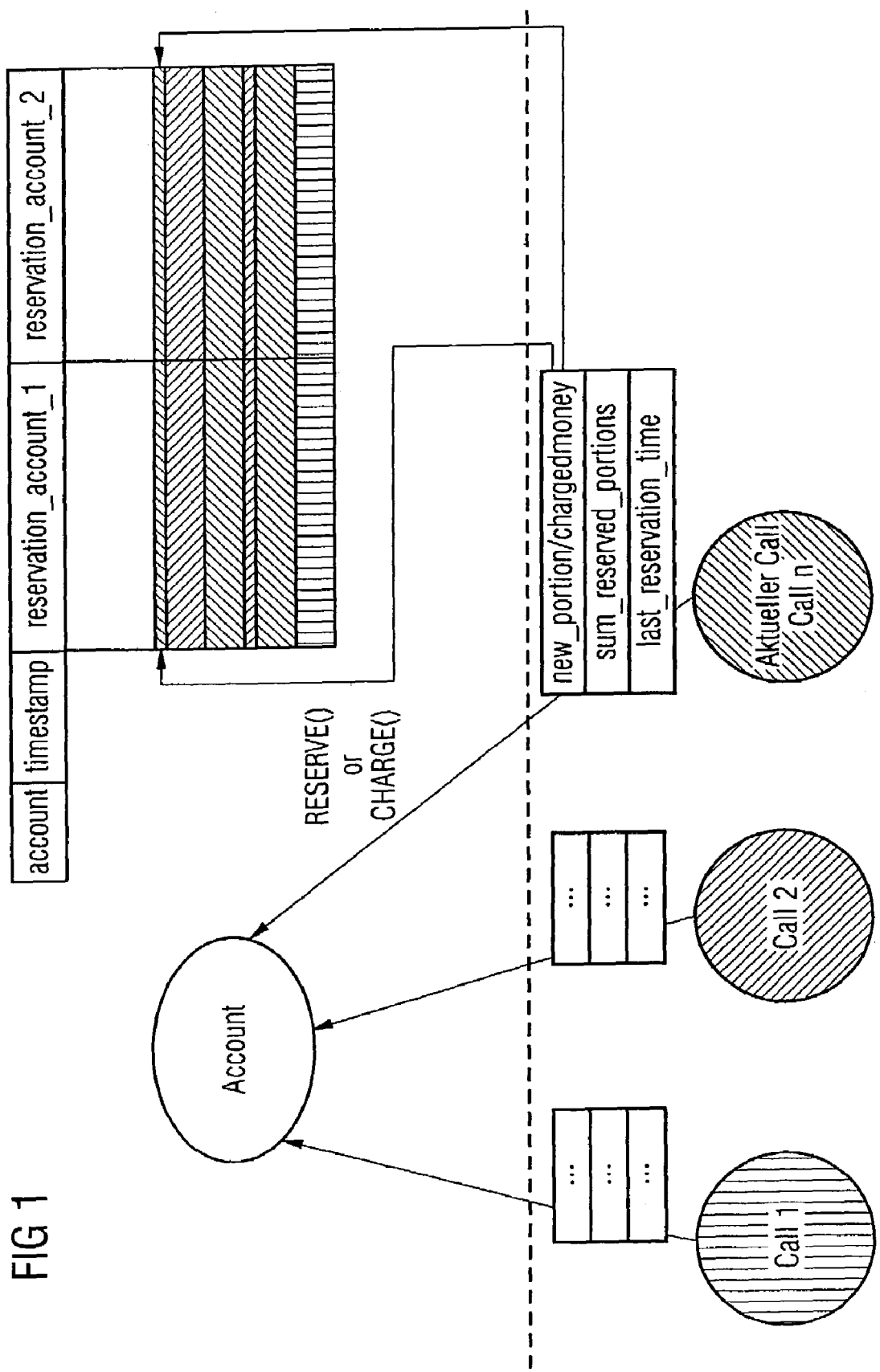
FIG. 1 shows three calls accessing an account and making reservations which have been confirmed for a first recovery interval.

The system outlined in FIGS. 1 to 4 relates to online-charged IN calls, the resource to be managed being a prepaid credit account, the server being an "account manager" and the clients being parallel IN calls Call 1 to Call n for which charges are routed via the same account.

For space/performance reasons, no call-specific information can be held in the account manager for an account. It is therefore preferable for the requesting entity to deliver the respectively necessary context information (see below) at the same time.

Account data

The following content fields are required:

| Field | Size in bytes | Remarks |
| --- | --- | --- |
| Account | 4 | Money available |
| timestamp | 4 | Time at which the two reservation counters next need to be aligned. Stipulates the "recovery interval" |
| reservation_account_1 | 4 | Actual reservation counter |
| Reservation_account_2 | 4 | Counter for the reservations confirmed in the current recovery interval |
| RTmax | 2 | Optional Maximum recovery time which has been requested in the current recovery interval Is used to determine the next recovery interval |
| RTlastmax | 2 | Optional Recovery time which has been used to determine the current recovery interval |

Alignment

If reservation_account_1 is greater than reservation_account_2, then
  reservation_account_1=reservation_account_2
  reservation_account_2=0

Recovery Time

Using the timestamp (next alignment) and the recovery time, the start of alignment of the two reservation counters is controlled (the condition below is checked for every RESERVE/CHARGE request):

If current time is greater than timestamp (next alignment), then
  increase timestamp (next alignment) by RTstat (static recovery time)
  start alignment A prerequisite is that the recovery time is stipulated once statically for an account. Should it be necessary to set the recovery time dynamically, then this is also conceivable under the following conditions:

a) extra data field in the account for holding the current recovery time (RTmax). For space reasons, the value of the recovery time should not exceed MAXSHORT.
b) it is possible to increase the length of the recovery time.
c) the maximum recovery time applies to requesting entities.

Action for the RESERVE request:

If currently transferred recovery time (RTnew) is greater than RTmax, then
  increase timestamp (next alignment) by delta (RTnew, RTmax)
  RTmax=RTnew Action for alignment:

If current time is greater than timestamp (next alignment), then
  increase timestamp (next alignment) by RTmax
  start alignment Restriction b) can remain limited to the recovery interval currently in progress at the cost of a further account field (RTlastmax). To this end, this additional field would need to include a note of the last recovery time which was used to form the new timestamp (next alignment) during alignment: the action for the RESERVE request would then need to be as follows:

If RTnew is greater than RTlastmax, then
  increase timestamp (next alignment) by delta (RTnew, RTlastmax)
  If RTnew is greater than RTmax, then
  RTmax=RTnew Action for alignment:

If current time is greater than timestamp (next alignment), then
  increase timestamp by RTmax
  RTlastmax=RTmax
  RTmax=0

Handling the context information for RESERVE

| Context element | Remarks |
| --- | --- |
| new_portion | Level of the portion currently to be reserved |
| sum_reserved_portions | Sum of all portions reserved to date in the entire call (without new_portion) |
| last_reservation_time | Time at which the last reservation was made |

This context information needs to be transferred for every RESERVE request, and is evaluated as follows:

alignment function (see above)

currPortion=reservation function with update reservation_account_1 (as before)

last_reservation_time is less than/equal to (timestamp (next alignment)−RT (RTlastmax/RTmax/RTstat (depending on variant)), then the call reports back for the very first time in the current recovery interval. Reservations from the last intervals and the current reservation need to be confirmed:

increase reservation_account_2 by currPortion and sum_reserved_portions if last_reservation_time is greater than (timestamp (next alignment)−RT (RTlastmax/RTmax/RTstat depending on variant)), then the call had already reported back in the current recovery interval and had confirmed all reservations from the last intervals the first time. It is therefore now only necessary to confirm the current reservation:

increase reservation_account_2 by currPortion

A simple COMMIT_RESERVATION operation can be introduced which then proceeds in a similar manner to RESERVE with currPortion=0.

Handling the context information for CHARGE

| Context element | Remarks |
| --- | --- |
| charged_money | Level of the money which is to be deducted |
| sum_reserved_portion | Sum of all portions reserved to date in the entire call |
| last_reservation_time | Time at which the last reservation was made. |

This context information needs to be transferred for every CHARGE request, and is evaluated as follows:

alignment function (see above)

charge function with update account and reservation_account_1 (as before) if last_reservation_time is less than/equal to (timestamp (next alignment)—RT (RTlastmax/RTmax/RTstat depending on variant)), then the call reports back in the current recovery interval for the very first time. Reservations from the last intervals need to be confirmed. Since the CHARGE function reclaims all announced charges anyway, nothing more needs to be done in this case.

if last_reservation_time is greater than (timestamp (next alignment)—RT (RTlastmax/RTmax/RTstat depending on variant)), then the call had already reported back in the current recovery interval and had confirmed reservations from the last intervals the first time. It is therefore also necessary to deduct the sum of the reservations: reduce reservation_account_2 by charged_money

COMMIT_RESERVATION

In the method described above, the RESERVE function has been used to confirm the reservations, for the sake of simplicity.

Alternatively, this purpose can be served by introducing a simple COMMIT_RESERVATION operation which then proceeds in a similar manner to RESERVE with currPortion=0 and needs to be requested regularly (at least once in the recovery interval).

Figure 2:
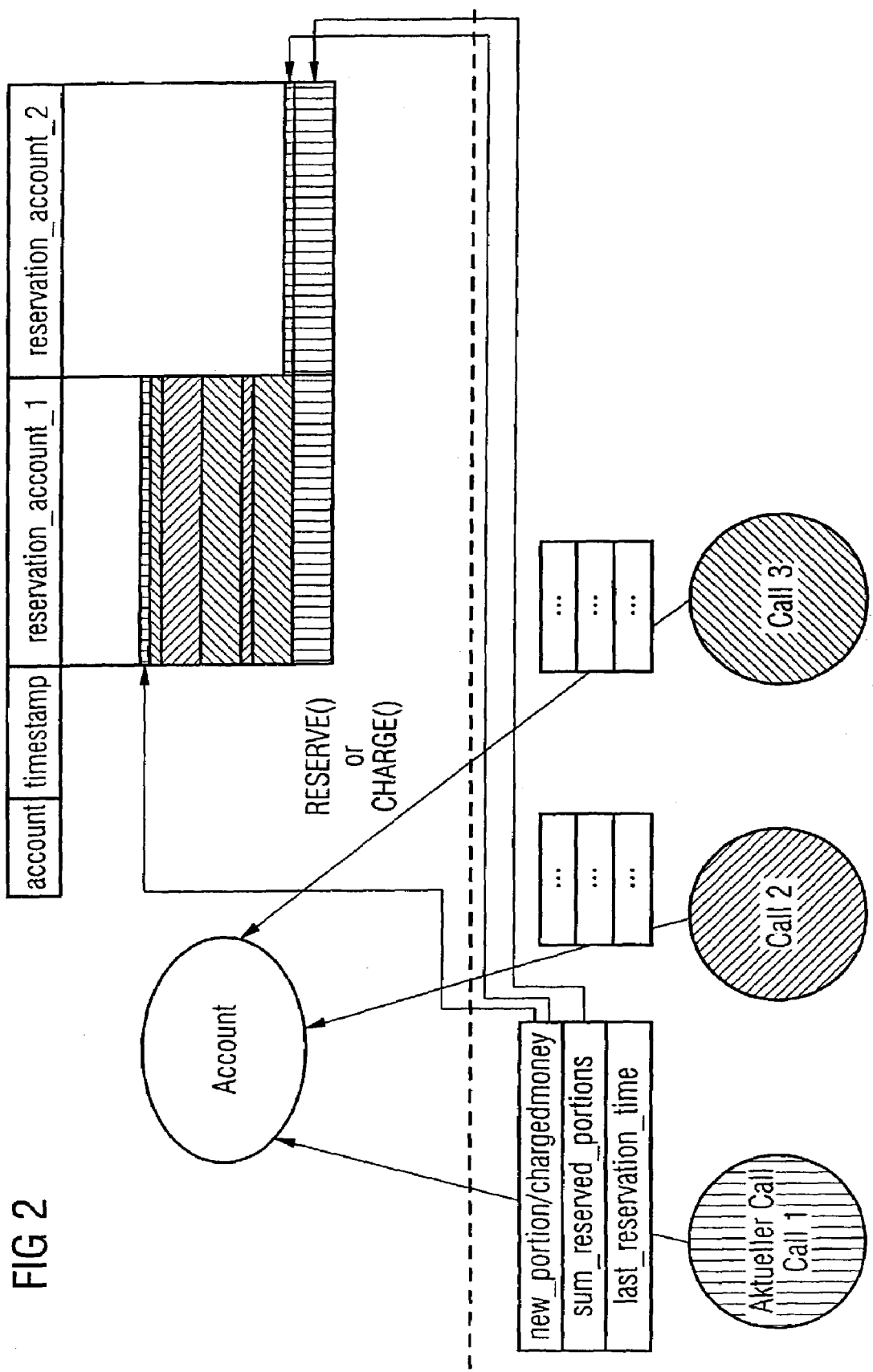
FIG. 2 shows, after the end of the first recovery interval, a first call accesses the account again.

The figures are fundamentally self-explanatory with regard to the above explanations of the terms used and procedures adopted. The situations illustrated are as follows:

In FIG. 1, three IN calls Call 1, Call 2 and Call n have accessed the prepaid credit account and have made reservations. The reservations have been confirmed for the first recovery interval. In FIG. 2, the first call Call 1 is the first to access the account again after expiry of the recovery time. The reservations are aligned with the confirmations. Since there are no differences, reservation_account_1 remains unchanged, while reservation_account_2 is reset. Call 1 confirms its original reservation and reserves a further credit sum.

Figure 3:
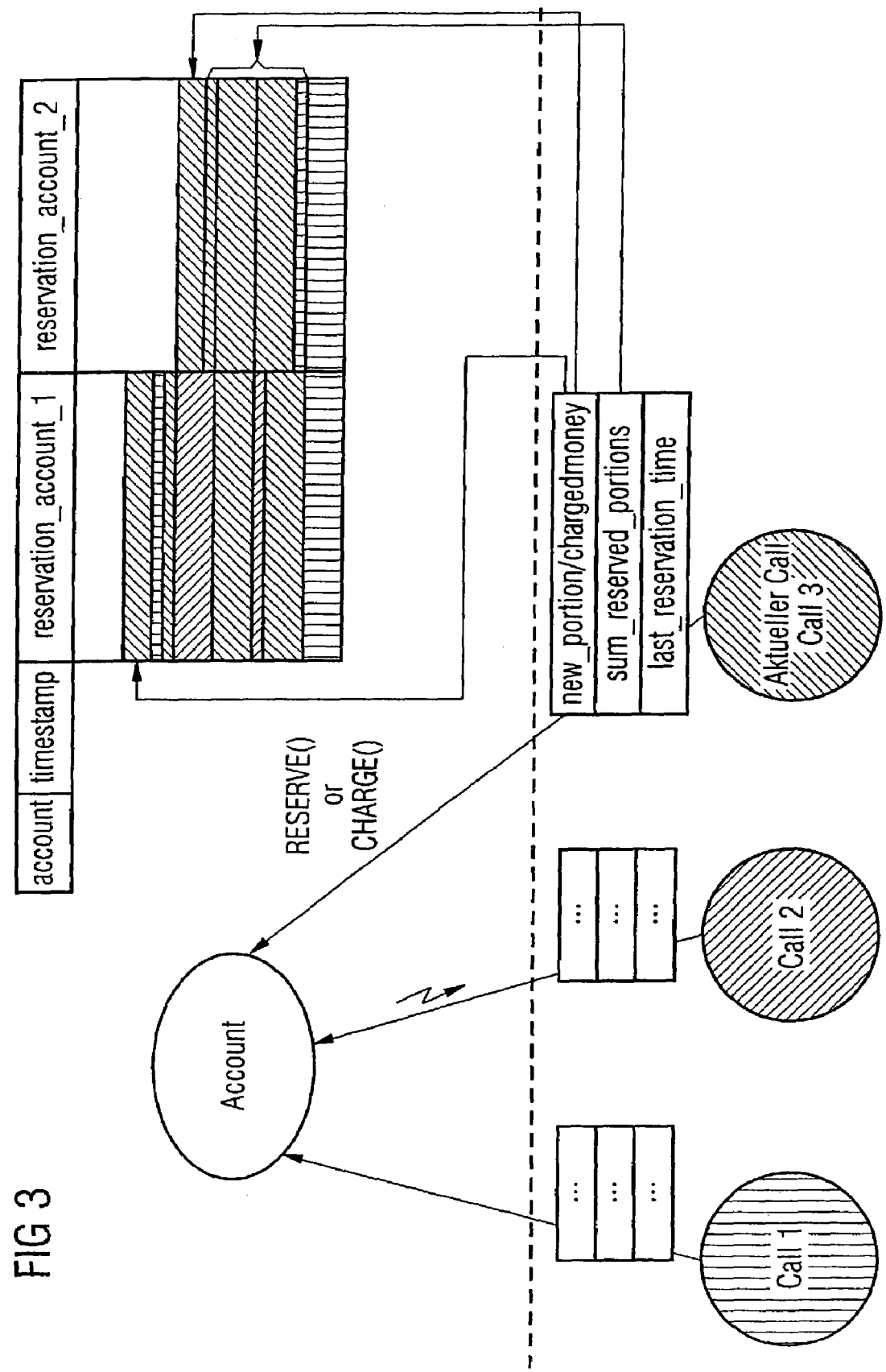
FIG. 3 shows, after the end of the first recovery interval, a second call accesses the account.
Figure 4:
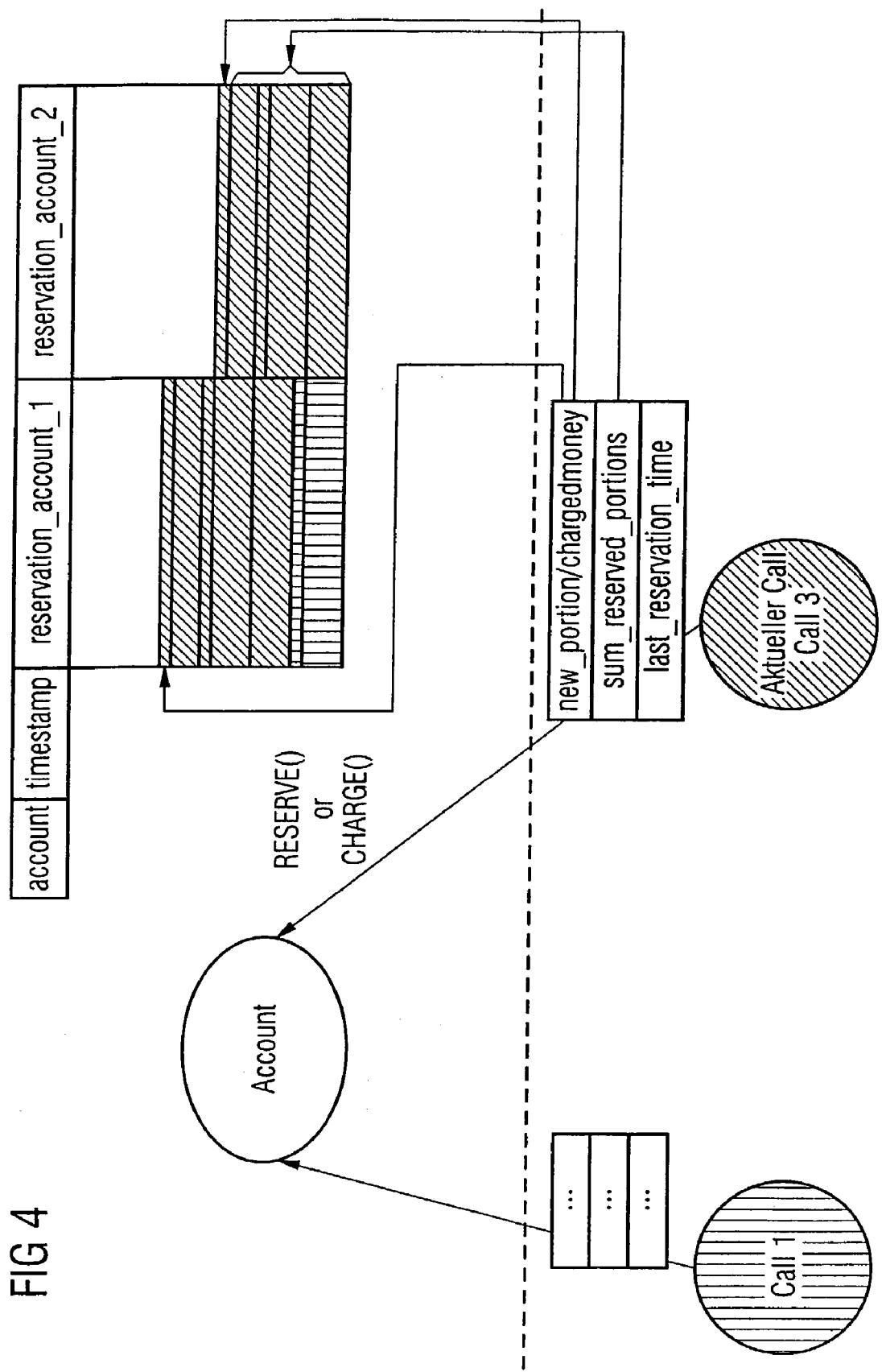
FIG. 4 shows, after the end of a second recovery interval, a call again accesses the account.

In FIG. 3, a further call Call 3 confirms the original reservation and reserves a further credit share (portion). The second call Call 2 has been terminated without the account manager receiving any corresponding information. In FIG. 4, Call 3 is the first to access the credit again after expiry of the recovery time. Reservations and confirmed reservations are aligned, and this time discrepancies have arisen on account of Call 2 not having reported back. Next, reservation_account_1 assumes values from reservation_account_2, and reservation_account_2 is reset. Call 3 again confirms its previous reservations and reserves a further portion.

The embodiments of the invention is not limited to the example described and to the method aspects highlighted above, but rather is also possible in a large number of modifications which are within the scope of technical action.

What is claimed is:

1. A method for server-assisted data processing on a plurality of clients connected at least temporarily to a server, where the server manages a defined quantity of processing resources, the clients reserve a respective subset of the processing resources for a reservation period, and the server manages the clients reservations and provides the clients with the reserved subsets of the processing resources for the reservation period, comprising:

managing individual reservations by actual reservation sum and sum of the confirmed reservations;

defining a confirmation period in which the server is ready to receive a reservation confirmation;

sending the clients the request for a reservation confirmation and information about the defined confirmation period;

sending the clients a reservation confirmation to the server in the confirmation period for the reservations required;

recording the server and managing the received reservation confirmations; and at the end of the confirmation period, releasing the reserved subsets of the processing resource for which there is no reservation confirmation.

2. The method as claim in claim 1, wherein a maximum reservation period is determined and stipulated that the length of a reservation period which the clients can obtain is at most equal to the maximum reservation period, and the length of the confirmation period is stipulated on the basis of the maximum reservation period.

3. The method as claimed in claim 1, wherein prior to the start of the method, a general request for reservation confirmation is transmitted to the clients which applies to all reservation periods while the method is being carried out.

4. The method as claimed in claim 1, wherein prior to the start of the method, the maximum reservation period and the confirmation period are defined.

5. The method as claimed in claim 1, wherein while the method is being carried out, the reservation periods are detected and are taken as a basis for determining the maximum reservation period, with the confirmation period being defined as a fixed value, based on the maximum reservation period.

6. The method as claimed in one of claims 1, wherein the confirmation period is defined dynamically as a ratio value, based on the maximum reservation period.

7. The method as claimed in claim 1, wherein at the end of the confirmation period, the quantity of available reservations is compared with the quantity of confirmed reservations, and unconfirmed subsets of the processing resource are released by equating the sum of the reservations to the sum of the confirmed reservations.

8. The method as claimed in claim 1, wherein the processing resources are a virtual sum of money, and the data processing comprises an electronic debit therefrom.

9. The method as claimed in claim 8, wherein an account data record for processing the virtual sum of money comprises the fields "account" for the available sum of money, "timestamp" for the ending time of the confirmation period, "reservation_account_1" for the counter for the reservations, and "reservation_account_2" for the counter for the reservations confirmed in the confirmation period.

10. The method as claimed in claim 9, wherein the account data record additionally comprises the fields "RTmax" for the current maximum reservation period and "RTlastmax" for the last valid maximum reservation period used for determining the confirmation period.

11. The method as claimed in claim 8, wherein each reservation request from a client comprises a context information item which comprises the context elements "new_portion" for the processing-resource subset which is to be reserved, "sum_reserved_portions" for the sum of the subsets currently reserved in a processing operation, without the new subset which is to be reserved, and "last_reservation_time" for the time of the last preceding reservation.

12. The method as claimed in claim 11, wherein a reservation confirmation comprises a context information item having the same structure as a reservation, the context element "new_portion" having been set to zero.

13. The method as claimed in claim 8, wherein a debit signal signaling that a processing operation has ended comprises a context information item which comprises the context elements "charged_money" relating to the size of the virtual sum of money which is to be debited, "sum_reserved_portions" relating to the sum of the subsets reserved to date in the processing operation, and "last_reservation_time" relating to the time of the last reservation.

* * * * *